United States Patent Office 3,423,239
Patented Jan. 21, 1969

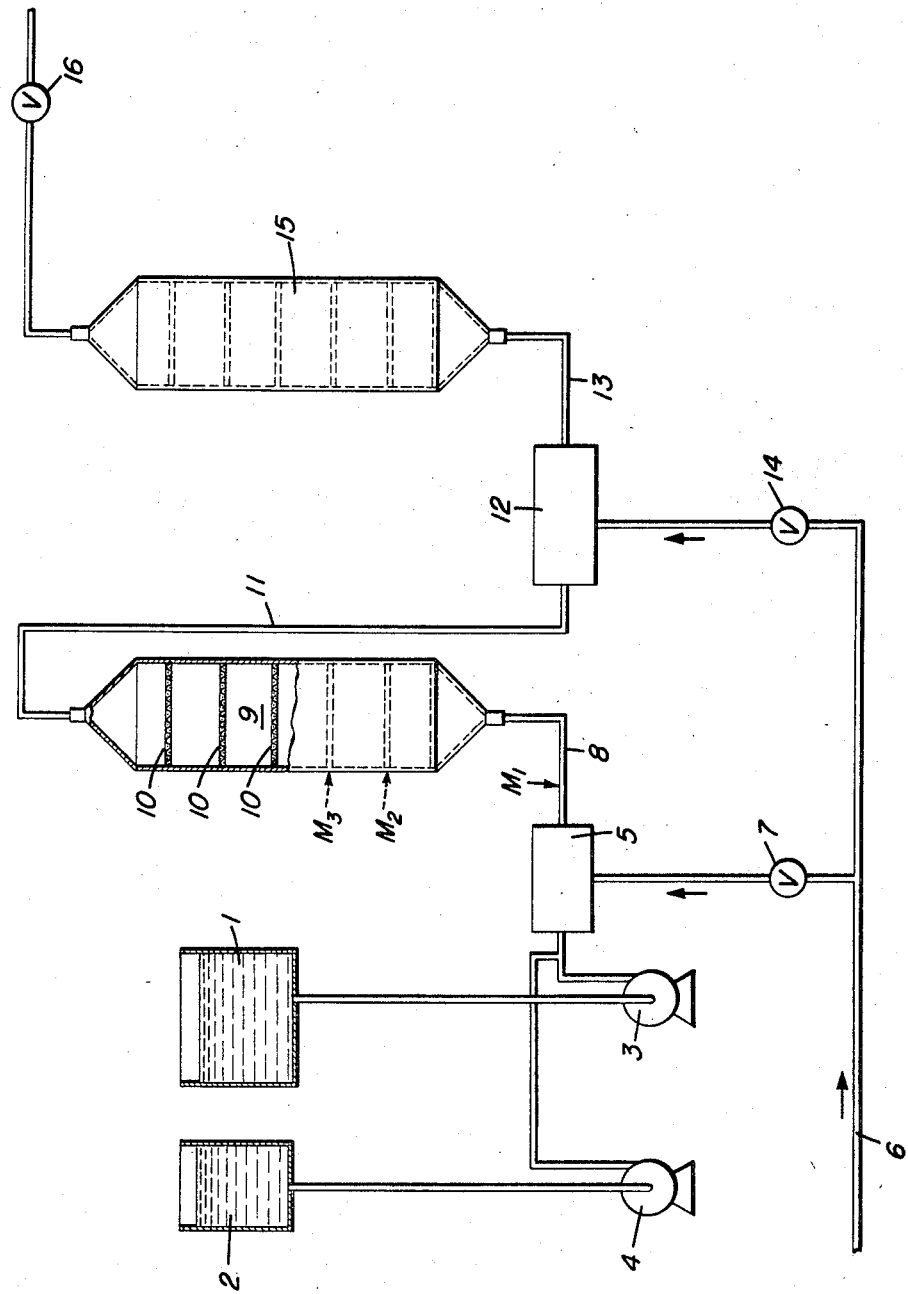

3,423,239
PROCESS FOR THE CONTINUOUS PRODUCTION OF STARCH DEGRADATION PRODUCTS
Hanno Goos, Castrop-Rauxel, Germany, assignor to West Virginia Pulp and Paper Company, New York, N.Y., a corporation of Delaware
Filed Apr. 19, 1965, Ser. No. 449,067
Claims priority, application Switzerland, Apr. 22, 1964, 5,247/64
U.S. Cl. 127—38                                          4 Claims
Int. Cl. C12d *13/04;* C13l *1/00*

ABSTRACT OF THE DISCLOSURE

In a continuous starch conversion process, wherein starch is converted by the use of biological or chemical catalysts, the viscosity of the reaction mixture is measured as a function of the pressure difference which exists between two points in the flow path of the reaction mixture.

---

This invention relates to a process for the continuous production of starch degradation products by a biologically or chemically controlled depolymerization of starch. Such starch degradation products are needed in numerous industries, for instance for paper making, textile finishing, the production of foods, etc.

The use of starch degradation products is preferred to the use of starch pastes because it is not possible to produce fluid pastes of concentration greater than about 12% due to the molecular size of native starch. Thus, if starch paste is used, a water ballast of at least about 78% must be entrained.

The production of starch degradation products, for instance dextrins or, depending upon the purpose of the application, oligosaccharides with molecular weights between 1800 and 18,000, has usually been effected in the past by an intermittent method. The procedure was that first a paste was prepared from native starch and water by mixing and heating to about 70 to 100° C., and then a suitable enzyme, such as alpha amylase, or an inorganic acid was added to the paste. Within a period of about 30 to 90 minutes, the starch was degraded enzymatically or chemically to the desired degree of polymerization. After attainment of this state, the reaction was stopped by heating to a temperature of about 110–150° C. in the case of an enzymatic degradation or by cooling in the case of a chemically controlled hydrolysis.

As such intermittent processes entail considerable disadvantages in practice, continuous processes have also become known. In one of these continuous processes, starch paste is adjusted to a low pH value and is pumped through an externally heated coil. The execution of this process, however, involves the disadvantage that the outer layers, that is, those close to the periphery, of the reaction mass are heated to temperature more rapidly and, moreover, also take on a higher temperature than the masses located in the center. This makes the homogeneity of the product and the uniform progress of the reaction doubtful.

Further, there is also known a process where a starch-catalyst-water mixture is forced through a reaction vessel, into which steam is introduced. This results in a substantially uniform heating of the entire reaction mixture and hence in a very homogeneous product. With this process, there is also achieved the advantage that, in the zone of the steam entrance, an acceleration of the reaction mass is attained, which in turn contributes to the smooth and faster execution of the degradation reaction.

With the last mentioned process, in order to complete the reaction, the reaction mixture is passed through reaction zones of expanding cross-sections to ensure the necessary permanence at the reaction temperature. In order that the mass will be mixed throughout as intimately as possible in the reaction zones, inserts are arranged therein, for example, in the form of baffle plates and screen bottoms. When using an enzyme catalyst, the mixture is heated, after leaving the reaction zone, to temperatures of about 110–160° C. by addition of more superheated steam. The result of this temperature rise is that the enzyme is inactivated and, consequently, the starch degradation does not progress any further. For the supervision and control of this technically smooth process, the reaction product after its discharge from the reaction apparatus is passed through a viscosimeter, whereby the viscosity at constant temperature is continuously determined and used as a measure of the depolymerization. This viscosity measurement can be carried out by stirring the product in a vessel by means of a worm, agitator, or the like, and measuring the resistance which the product offers to the agitator. It has been found that the viscosity is a very reliable measure of starch degradation, i.e. of the attained degree of polymerization. Instead of the viscosity, however, other physical or chemical properties of the reaction product may be measured. One possibility, for instance, would be the reducing capacity toward weak oxidizers, such as copper salts or silver salts in alkaline solution, it being possible to then determine the reaction colorimetrically or electrochemically. However advantageous the mentioned process may be, it has been found that due to the relatively long time required to complete the hydrolysis, the so-called dead time of the indicating or regulating process is very great.

According to the present invention, the so-called dead time disadvantage mentioned above can be avoided in a biologically or chemically controlled deploymerization of starch where an aqueous, catalyst-containing starch suspension is heated to an elevated temperature by the direct introduction of steam. This disadvantage can be overcome by measuring the viscosity of the mixture immediately after heating the mixture to reaction temperature, i.e., shortly after the setting in of the degradation reaction, and as a function of the viscosity at this point, the reaction temperature and/or the catalyst concentration and/or permanence of the reaction mixture at the reaction temperature can be adjusted. In fact, it has been found that in the execution of the catalytically controlled starch hydrolysis with heating by the direct introduction of steam, the degradation occurs spontaneously immediately after the reaction temperature is attained, and is carried out so thoroughly during the first seconds to minutes of the reaction that an effective measurement of the reaction results is possible.

The determination of the viscosity is carried into effect with the process according to the present invention in that a physical or chemical quantity is measured which depends on the viscosity in a fixed relation. It is proposed to measure, for the purpose of this invention, the pressure difference which exists between two adjacent points in the flow path of the reaction mixture.

To explain the process of the invention further, reference is made to the annexed drawing, which represents in simplified form an installation for the execution of the process.

The starch suspension to be degraded hydrolytically is contained in a vessel 1, and the catalyst solution, for instance an enzyme solution, is contained in the vessel 2. These two solutions are pumped through the pumps 3 and 4 into the cooker 5, are mixed on their way there or in the cooker itself, and the mixture is heated with hot steam in the cooker 5 to the reaction temperature. The hot steam is taken from the steam line 6 and is supplied to the vessel 5 through the valve 7. The heated reaction mixture then passes through line 8 into the reactor 9. As the mixture flows through the entire apparatus at constant speed, there results in the reactor 9 an increased permanence, which becomes fixed, with which the reaction time corresponds. At 10 are indicated the already mentioned screen bottoms, which bring about a mixing of the reaction mass in the reactor 9.

After the mixture leaves the reactor 9, it is supplied through line 11 to the cooker 12, here by the addition through valve 14 of more steam, which may be superheated if necessary, it is heated to an elevated temperature of 110–160° C. The reaction mass then passes through line 13 to the reactor 15, where the enzyme is inactivated and the hydrolysis stopped. Valve 16 serves to remove the reaction mixture under pressure and to expand it. In case the hydrolysis is catalyzed chemically, that is, by means of an acid, the reaction must be stopped by cooling the mixture. In this case, the supply of steam at 12 is omitted, and the reactor 15 is replaced by a cooling device.

To carry out the process according to the present invention, the viscosity of the reaction mixture is measured directly after the heating to reaction temperature, that is, after cooker 5. This is done by measuring the pressure difference, for instance, between the points M1 and M2 or M1 and M3 or M2 and M3, for example, by means of a commercial pressure transmitter. Since due to the direct heating of the reaction mixture by hot steam the degradation reaction occurs spontaneously and presumably proceeds to the end according to an e-function, a sharp decrease of the viscosity of the reaction mass is observable at the indicated points. According to this decrease, the entire process can be controlled as desired by measuring the pressure difference which corresponds with the viscosity decrease.

By the process according to the present invention, it is possible to reduce the dead time of the regulation from normally 30–60 minutes to 1–2 minutes. Thereby, in particular with relatively large units, considerable losses are avoided, and it becomes possible to adapt the production to the particular conditions rapidly.

I claim:
1. In a process for the continuous production of starch degradation products which includes a flow path comprising the steps of introducing a reaction mixture of an aqueous starch suspension and a starch-degrading catalyst into a first reaction vessel, heating the reaction mixture to reaction temperature by the direct introduction of steam into the reaction mixture, passing the reaction mixture to a second reaction vessel, maintaining the reaction mixture at an elevated temperature until the desired degree of depolymerization of the starch is attained, and stopping the depolymerization reaction by varying the temperature of the reaction mixture, the improvement for determining the degree of depolymerization of the starch which comprises measuring the pressure difference between two points in the flow path of the reaction mixture, the first of the said two points being located in the flow path immediately after the reaction mixture in the first reaction vessel is heated to reaction temperature, and the second point being located in the second reaction vessel.

2. The process of claim 1 in which the starch-degrading catalyst is an inorganic acid.

3. The process of claim 1 in which the starch-degrading catalyst is a starch-degrading enzyme.

4. The process of claim 3 in which the starch-degrading enzyme is α-amylase.

References Cited

UNITED STATES PATENTS

| | | | |
|---|---|---|---|
| 2,325,573 | 7/1943 | Thompson et al. | 127—28 |
| 2,359,763 | 10/1944 | Horesi | 127—38 |
| 2,452,142 | 10/1948 | Pecker | 127—28 |
| 2,565,404 | 8/1951 | Staerkle et al. | 127—38 |
| 2,845,367 | 7/1958 | Alt et al. | 127—23 X |
| 2,940,876 | 6/1960 | Elsas | 127—28 |
| 2,946,706 | 7/1960 | Boon et al. | 127—38 |
| 3,169,083 | 2/1965 | Taylor | 127—38 |
| 3,308,037 | 3/1967 | Goos et al. | 127—36 X |

MORRIS O. WOLK, *Primary Examiner.*

S. MARANTZ, *Assistant Examiner.*

U.S. Cl. X.R.

127—28, 36, 70; 195—31